United States Patent [19]
Bakhir et al.

[11] Patent Number: 5,783,052
[45] Date of Patent: Jul. 21, 1998

[54] ELECTROCHEMICAL CELL

[75] Inventors: Vitold M. Bakhir; Jury G. Zadorozhny, both of Moscow, Russian Federation

[73] Assignee: RSCECAT, USA, Inc., Las Vegas, Nev.

[21] Appl. No.: 820,260

[22] Filed: Mar. 18, 1997

Related U.S. Application Data

[63] Continuation of Ser. No. 613,968, Mar. 11, 1996, Pat. No. 5,635,040.

[51] Int. Cl.$^6$ .................................................. C25B 9/00
[52] U.S. Cl. .......................... 204/260; 204/272; 204/275
[58] Field of Search .................................. 204/260, 264, 204/295, 272, 263, 278, 275

[56]         References Cited

U.S. PATENT DOCUMENTS

| | | | |
|---|---|---|---|
| 5,427,667 | 6/1995 | Bakhir et al. | 204/272 X |
| 5,529,672 | 6/1996 | Barr et al. | 204/278 |

*Primary Examiner*—Donald R. Valentine
*Attorney, Agent, or Firm*—John Edward Roethel

[57]        ABSTRACT

An electrochemical cell for the treatment of water and/or water solutions comprises an internal electrode having a middle section and a pin-end at each end thereof, the diameter of each pin-end being not more than 0.75 of the diameter of the middle section; an external electrode mounted around the internal electrode; and a coaxial ceramic diaphragm mounted in a separate inter-electrode space in an electrode chamber of the cell. The external electrode is mounted in lower and upper dielectric bushings. Both the internal electrode and the external electrode are connected with positive and negative poles of a power supply. The cell further includes an upper dielectric collector head and a lower dielectric collector head which each have an axial channel; each collector head being installed in the bushing slots and adapted for turning therein. The diaphragm being fastened by elastic gaskets mounted in the slots of the bushings. The diameter of the middle section of the internal electrode being defined by the formula:

$$2M < D < 4M$$

where:
   D=diameter of the middle section of the internal electrode in mm, and
   M=distance between electrodes in mm.

The length of the middle section of the internal electrode is either shorter than the length of the external electrode on the value 2M or longer than the length of external electrode on the value of not less than 2M.

4 Claims, 3 Drawing Sheets

ELECTROCHEMICAL CELL

This is a continuation of application Ser. No. 08/613,968, filed Mar. 11, 1996, now U.S. Pat. No. 5,635,040.

This invention relates to chemical technology, and more particularly to electrochemical cells for the treatment of water and/or water solutions and can be used for electrochemical regulation of acid-alkaline properties, Oxidation-Reduction Potential (ORP) and catalytic activity of water and/or water solutions, as in electrochemical manufacturing of different products by the electrolysis of water solutions.

BACKGROUND OF THE INVENTION

In the field of applied electrochemistry, different design electrolyzers are used either for water and/or water solutions treatment, or for different product manufacturing. For instance, there are electrolyzers with flat electrodes pressed against the diaphragm (see the Author's certificate USSR No. 882944, 1979) or electrolyzers with coaxial cylindrical electrodes and a ceramic diaphragm between them (see the published patent application of Japan No 1-104387, 1989).

However, module electrolyzers are the most advanced because they provide the required production capacity by joining together the necessary number of modules. This reduces the design and production expenses of electrolyzers depending upon the required capacity and also helps to unify parts and reduce the time for assembly and disassembly of such electrolyzers.

The closest by the technical design and achieved result is a device for water treatment, executed by the module principle using electrochemical cells which contain coaxial cylindrical and rod electrodes and a coaxial ultrafiltration ceramic diaphragm made from materials using as their base zirconium, aluminum and yttrium oxides (see U.S. Pat. No. 5,427,667). The water treatment technical approach is chosen as a prototype.

The rod electrode is made with variable sections in the prototype and the diameter of its pin-ends is 0.75 of the diameter of its middle section. This allows for the improvement of hydraulic mode. In addition, dimensions of the electrodes and the diaphragm are specified in the formula, limiting their mutual change.

In the prototype, the rod and the cylindrical electrodes, as well as the diaphragm, are fixed in special dielectric bushings with channels for the treated water supply to be fed into and to be discharged from the rod electrode chamber. There are channels on the lateral surface of the cylindrical electrode, on its upper and lower parts, to supply and discharge treated water from the chamber of the cylindrical electrode. Water is treated while passing through the cell chambers from the bottom to the top.

Required production capacity devices are assembled with the number of cells by using special collectors, which are made either as a monolithic detail or special separate blocks for one cell and provided with joining and sealing tools. The order in which the electrodes connect to the poles of the power supply depends on the type of desired application.

The prototype treats water or water solution efficient at low energy consumption. The prototype is sufficiently simple in use, assembly and disassembly.

However, the prototype has disadvantages. Special collectors enlarge the size of the device, increase its hydraulic resistance and require the use of more powerful pumps. It also requires numerous joint parts and seals for them. The prototype does not work effectively under the different polarity of electrodes due to its constructive features. So when the rod electrode works as an anode, the coating wears outs rapidly in places of transition from the middle part to the pin ends (not including the holes whose share of the surfaces is small). All of the remaining place of transition is in the field of the cylindrical electrode and is subjected to an intensive influence of high intensity electric field (concentration of field in the places of changing form). It is not possible to control gas-filling of the treated solution in the prototype. The prototype device is also complicated in fabrication, because strict coaxiality for all details and the diaphragm are required. The fixation system for the rod electrode has difficulties in manufacture, due to the annular deepening on the internal surface of the bushings channels and placing seals in them.

The object of the present invention is to simplify the cell design and make it possible to place the required amount of cells in a smaller space; simplification of the fixation system for the elements of the cell; improving the reliability and increasing the lifespan of the cell due to the elimination the influence of a curved electrical field in the space between electrodes, as well as expansion of the functional abilities for the cell by making it possible to regulate the influence of gas-filing of the electrolyte on the electrochemical process.

This objective can be achieved when the electrochemical cell for water and/or water solutions treatment is made from vertical cylindrical coaxial parts such as an internal electrode of variable sections (the diameter of its end parts being not more then 0.75 of the diameter of its middle part), an external electrode and a coaxial ceramic diaphragm (made from materials having as their base zirconium oxides with additives of aluminum and yttrium oxides) which separates the inter-electrode space in the electrode chambers. The electrodes are made from material that is nonsoluble during electrolysis. The external electrode is installed in lower and upper dielectric bushings. Moreover there are slots on the butt-ends of upper and lower bushings, and the cell contains upper and lower dielectric collector heads, which have an axial channel. Moreover the heads are installed in the slots of bushings with the capability of turning. The diaphragm is fastened by elastic gaskets, which are placed in bushing slots. The diameter of the middle section of internal electrode is defined by the following formula:

$$2M < D < 4M$$

where: D=the diameter of the middle section of the internal electrode in mm, and M=the distance between electrodes in mm.

Depending on the execution and polarity of the electrodes, the length of the middle section of the internal electrode can be either shorter than the length of the external electrode on the value of 2M or longer than the length of the external electrode on the value of not less than 2M. The preferred distance between electrodes is 2.8–3.3 mm. The internal electrode is fastened inside the heads by elastic gaskets planed in the axial head channels. The purpose of the channels in the lower and upper heads and in the lower and upper bushings is to supply and discharge treated water and/or solution into the internal and external chambers of the electrodes. The channels reach to lateral surfaces and are provided with outlets. The length of the external electrode can be varied from 50 mm to 240 mm depending on need.

Materials for the electrodes can be chosen from existing sources and the choice depends on the conditions and requirements for the design of the device. Should changing the polarity of electrodes not be required, titanium electrodes coated by titanium oxide and ruthenium oxide, or titanium electrodes coated by precious metals or manganese oxide or tin oxide or cobaltous oxide, can be used as an anode. Polished titanium or polished tantalum or polished zirconium coated by pyrographite or glass carbon or other coatings can be used as a cathode. If changing the polarity of electrodes is required, titanium electrodes coated by platinum or platinum-iridium can be used. It is possible to use different combinations of the materials listed above or other materials known in applied electrochemistry.

The diaphragm of the electrochemical cell is made from ceramics made from zirconium, aluminum and yttrium oxides, and can contain additives such as niobium oxide, tantalum oxide, titanium oxide, gadolinium oxide, hafnium oxide and others. Depending on the application, the diaphragm can be made as an ultrafiltration, a microfiltration or a nanofiltration. The forms of the diaphragm can be varied. The diaphragm can be a truncated cone with the conicity value 1: (100–1000) and a like thickness of walls equal to 0.4 mm–0.8 mm on the whole length of the diaphragm. The diaphragm can be installed in the cell either its big base facing downward or its big base facing upward.

The external (or internal) surface of the diaphragm can also be made as a cylinder, with the remaining surface (internal or external) made as a cone with the conicity value 1: (100–1000). In this case, the wall thickness of one butt-end is 0.4 mm–0.5 mm and the wall thickness of the other butt-end is 0.7 mm–0.8 mm. The diaphragm is installed in the cell with its butt-end with thickest wall either facing downward or facing upward.

The external and internal surfaces of the diaphragm can also be made as truncated cones with the conicity value 1: (100–1000). Moreover the cone tops are positioned at opposite end of the diaphragm and the thickness of the walls of one butt-end is 0.4 mm–0.5 mm and the thickness of the other butt-end is 0.7 mm–0.8 mm. The diaphragm is installed in the cell so that the butt-end with the thickest wall either is turned downward or is turned upward.

The internal and external surface of diaphragm can also be made as a cylinder with the wall thickness 0.4 mm–0.7 mm. Deviation from the geometric correct surface of the diaphragm should be not more than 0.05 mm in any part of its surface. The internal electrode is made either solid or hollow inside. The internal electrode can include several details, which are made from one or more materials, and are united by different methods (depending on materials), such as laser beam welding, vacuum welding, mechanically joining and the like. A thread is provided on the pin-ends of the internal electrode for adjustment of the head by manipulating washers and nuts.

Different combinations of internal electrode dimensions can be used, depending on the order in which the electrodes are connected with poles of the power supply. For instance, if the external electrode is connected with the negative pole of the power supply and the internal electrode is connected with the positive pole of the power supply, the length of the middle section of the internal electrode exceeds the length of the external electrode by a value of not less than 2M and the internal electrode is installed in the cell symmetrically to the external electrode. If the external electrode is connected with the positive pole of the power supply and the internal electrode is connected with the negative pole of the power supply, then the internal electrode middle section length is equal or less than the external electrode length on the value of 2M and the internal electrode is installed in the cell symmetrically to the external electrode.

To provide strict coaxiality of electrodes in the cell, different variants are to be used for fastening of the internal electrode in the axial head channels depending on the dimensions of the electrodes.

When the length of the internal electrode exceeds the length of the external electrode by sufficient length, the axial head channel is contained within the variable section and the middle section of internal electrode with the big diameter forms a slot joint with the axial channels of the heads in which the elastic gaskets are placed. If the middle section of the internal electrode forms a slot joint with the axial channels of the upper and lower heads, then elastic gaskets are placed in the grooves of the middle section of the internal electrode. If the internal electrode is fastened by pin-ends, the axial head channel diameter is equal to the diameter of the pin-ends of the internal electrode; elastic gaskets are placed in grooves on the pin-ends of the internal electrode; or axial head channels having a diameter equal to the diameter of the internal electrode pin-ends and having an extension in the butt-ends; elastic gaskets are placed in this extension. In addition, the cell has clamping dielectric bushings which are also placed in this extension.

These improvements result in a better functioning and superior cell. Using coaxial electrodes and a diaphragm, and installing them in dielectric bushings and heads, allows for an optimal hydraulic regime and the simplification of the cell assembling. There is no need to drill a holes in the external cylindrical electrode, thus making it simple to manufacture. Because it is possible to turn the heads and regulate the outlet position, several cells can be assembled together compactly in one device.

DETAILED DESCRIPTION OF THE PREFERRED EMBODIMENTS

Figure 1:
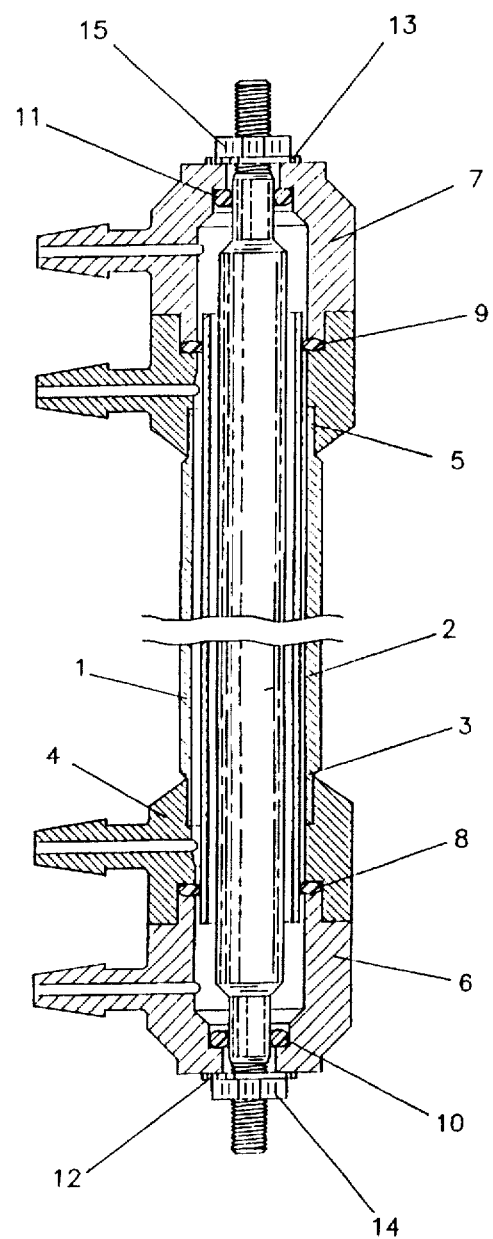
FIG. 1 shows a cross section of the electrochemical cell of the present invention.

With reference to FIG. 1, the electrochemical cell of the present invention comprises a coaxial external cylindrical electrode 1, an internal electrode 2 and a ceramic diaphragm 3 placed between them. The external electrode 1 is fixed tightly and hermetically in lower dielectric bushing 4 and upper dielectric bushing 5, each of which have channels for treated water and/or water solutions supply into and discharge from the chamber of the external electrode. The channels reach to the lateral surface of the bushings and are provided with pipe connections. The lower dielectric collecting head 6 and the upper dielectric collecting head 7 have channels for treated water and/or water solutions to be supplied into and to discharge from the chamber of the internal electrode 2. The dielectric collecting heads 6,7 are joined to the dielectric bushings 4,5 by slot joints. The head channels also reach to the lateral surface and are provided with pipe connections. There are also axial channels in the dielectric collecting heads 6,7. The pin-ends of the internal electrode 2 enter into axial channels. The diaphragm 3 is sealed in the dielectric collecting heads 6,7 by gaskets 8 and 9, respectively, which are placed in the slot joints between the bushings and heads. The internal electrode 2 is sealed by elastic gaskets 10 and 11. There is a thread on the pin-ends of the internal electrode to which washers 12 and 13 and nuts 14 and 15 are fastened. Assembling and sealing of the cell is achieved by bolting with nuts 14, 15 and washers 12, 13 of the bushings and heads together to the butt-end of the external electrode 1 after the determination of the position of the head.

Figure 2:
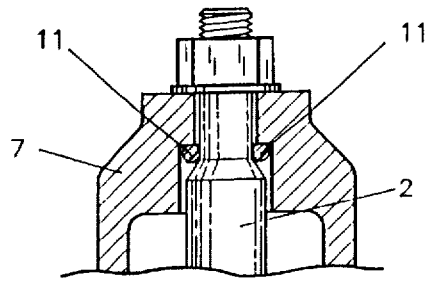
FIG. 2 shows one version of a structure for the fastening of the internal electrode in the collecting heads of the electrochemical cell of the present invention.

The position and type of elastic gaskets 10 and 11 depends on the construction of the internal electrode. When the middle section of the internal electrode 2 and the axial channel of the head 7 form a slot joint (FIG. 2), the seal 11 is located in the slot joint, i.e. where the internal electrode 2 and the axial channel each change its diameter. In this case, the seal is loaded uniformly, which reduces the risk of its deformation. The seal 10 is similarly installed in the head 6.

Figure 3:
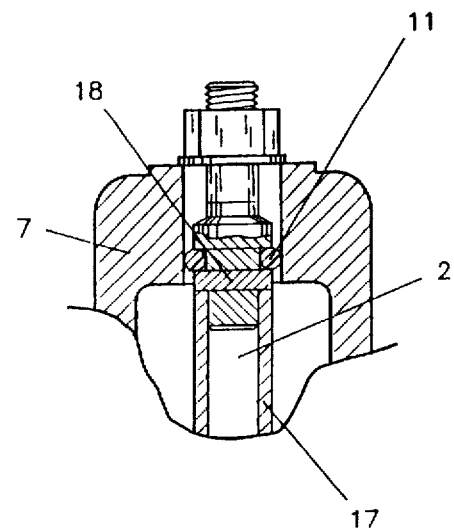
FIG. 3 shows a second version of a structure for the fastening of the internal electrode in the collecting heads.

When the middle section of the internal electrode 2 and the axial channel of head 7 form a slot joint in a place of connecting diameters, the top part of the electrode 2 has grooves for the seal 11 (FIG. 3). The internal electrode 2 is a combination of a hollow cylinder 17 and a solid pin-end 18 as is shown in FIG. 3.

Figure 4:
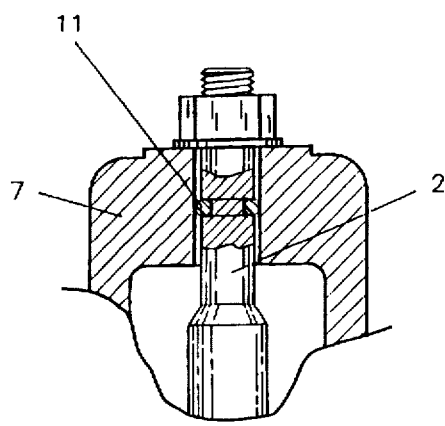
FIG. 4 shows a third version of a structure for the fastening of the internal electrode in the collecting heads.
Figure 5:
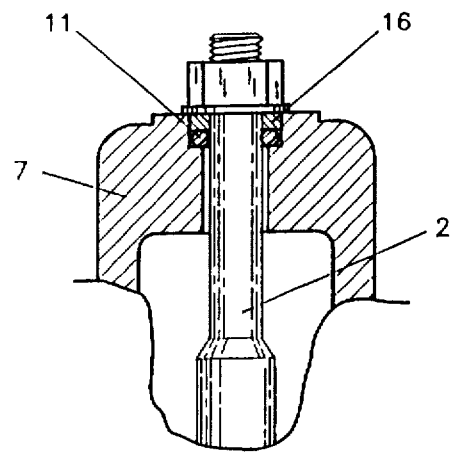
FIG. 5 shows a fourth version of a structure for the fastening of the internal electrode in the collecting heads.

If the diameter of the axial channel of head 7 is equal to the diameter of the pin-ends of the internal electrode 2, then grooves for the seal 11 can be made on the end parts (FIG. 4); or the axial head channel is wider at the butt-end for placing the seal 11 and adding washers 16 (FIG. 5).

The internal electrode is made with variable sections. The diameter of the pin-ends of the electrode is not more than 0.75 of the middle section diameter of the electrode. This ratio provides optimal hydrodynamic characteristics and makes it possible to reliably fasten an electrode in the heads by different ways of elastic gaskets to set up. The internal electrode can be made as either a solid cylinder or a hollow cylinder with solid pin-ends to provide a required form of the electrode. Ways for joining parts can be different depending on the applicable material. Either mechanical joining or other types of joining, such as vacuum welding or laser beam welding, can be used to obtain durability and reliable conductivity. Using a hollow electrode not only reduces weight of device and saves materials, but also allows to direct work on current electrochemical process due to changing conditions for the forming of surface charge of electrode. Besides, an internal electrode works as a joint detail, since there is a thread on its pin-ends for washers and nuts setting, which joins the cell and provides hermetic sealing, as well as fixing the heads in the given working position.

The diaphragm is made from ceramic materials based on zirconium oxide with additives of aluminum oxide and yttrium oxide and the diaphragm possesses high resistance to acids, alkaline and aggressive gases, has a long lifetime and is easy regenerated. Different additives allow for the adjustment of the characteristics of diaphragm surface and have a direct influence on the electrochemical process, which is particularly important when the electrochemical cell is used for obtaining some special product. The diaphragm can be made from different materials either as ultrafiltration, microfiltration or nanofiltration, depending on problem to be solved.

The form of the diaphragm, as well as the manner of the diaphragm installation affects on working conditions of the cell comparative to the treated water flow. The diaphragm may take many different forms.

Figure 6:
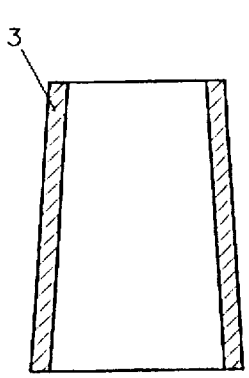
FIG. 6 shows a first alternative diaphragm design used in the electrochemical cell of the present invention.
Figure 7:
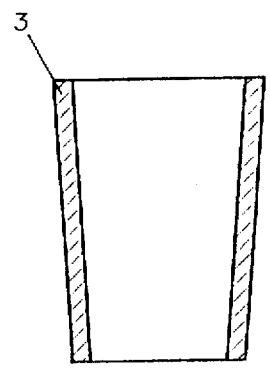
FIG. 7 shows a second alternative diaphragm design used in the electrochemical cell of the present invention.

As shown in FIGS. 6 and 7, the diaphragm 3 can be a truncated cone with the conicity value 1: (100–1000) and alike thicknesses of walls from 0.4 mm to 0.8 mm on the whole length; it can be installed in the cell either big base downward (FIG.6) or big base upward (FIG. 7).

Figure 8:
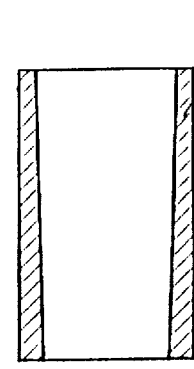
FIG. 8 shows a third alternative diaphragm design used in the electrochemical cell of the present invention.
Figure 9:
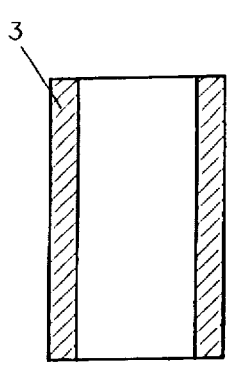
FIG. 9 shows a fourth alternative diaphragm design used in the electrochemical cell of the present invention.
Figure 10:
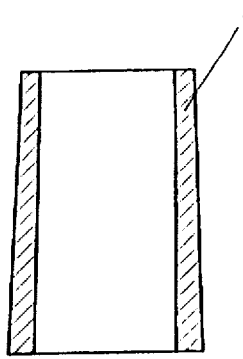
FIG. 10 shows a fifth alternative diaphragm design used in the electrochemical cell of the present invention.
Figure 11:
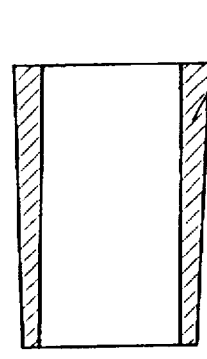
FIG. 11 shows a sixth alternative diaphragm design used in the electrochemical cell of the present invention.

As shown in FIGS. 8 and 9, the external surface of diaphragm 3 can be executed as a cylinder and the internal surface of the diaphragm can be executed as a cone with the conicity value 1: (100–1000) with either big base down (FIG. 8) or big base up (FIG. 9). Alternatively as shown in FIGS. 10 and 11, the internal surface of diaphragm 3 can be executed as a cylinder and the external surface of the diaphragm can be executed as a cone with the conicity value 1: (100–1000) with either big base down (FIG. 10) or big base up (FIG. 11). In either case, a wall thickness of one butt-end is 0.4 mm–0.5 mm, a wall thickness of another butt-end is 0.7 mm–0.8 mm; and the diaphragm is installed in the cell thereby, with the butt-end with the thicker wall turned downward or turned upward.

Figure 12:
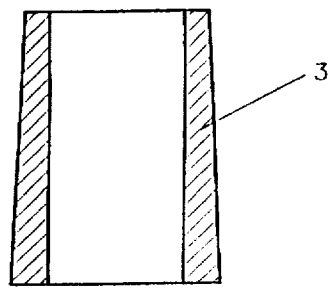
FIG. 12 shows a seventh alternative diaphragm design used in the electrochemical cell of the present invention.
Figure 13:
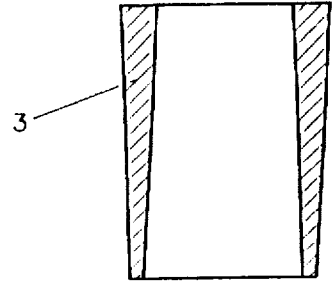
FIG. 13 shows an eighth alternative diaphragm design used in the electrochemical cell of the present invention.

As shown in FIGS. 12 and 13, both the external and internal surfaces of diaphragm 3 can also be made as a truncated cone with the conicity value 1: (100–1000). In this alternative, the tops of the cones are directed to opposite sides and the thicknesses of walls are such that one butt-end is 0.4 mm–0.5 mm, another one is 0.7 mm–0.8 mm. The diaphragm is installed in the cell with the butt-end with the thicker wall either turned downward (FIG. 12) or turned upward (FIG. 13). Using a diaphragm with a lower conicity value does not produce different results in comparison with a cylindrical diaphragm. When using a diaphragm with higher conicity value, as well as one with increased wall thickness, it is necessary to alter the dimensions of the cell and increase the inter-electrode distance which causes increasing power consumption for the electrochemical process. A wall thickness lower than above mentioned increases the brittleness of the diaphragm and decreases its lifespan, making it more difficult to assemble and disassemble a cell. It is possible to regulate the electrochemical process by using a diaphragm with a variable profile. For instance, the diaphragm is installed in the cell in the way that the cross section of the chambers is increased from the bottom to the top of cell for the processes with high evolution of gas. Alternatively, the diaphragm is installed in the cell in the way that the cross section of the chambers is decreased from the bottom to the top in order to increase gas-filling in the top of cell and reduce the intensity of the electrochemical treatment of solution in the last cut of cell. Using diaphragms which provide a variable profile for only one chamber (one surface is a cone and another surface is a cylinder) allows a difference in the volume of evolution of gas in both chambers during the process. Besides that, such diaphragms (as well as the diaphragms with both the external and internal surfaces being cones and the tops of the cones are directed in the opposite way) can be used for different quality and content solutions treatment in electrode chambers of cell.

The internal and external surfaces of the diaphragm can be made as both cylinders with the wall thickness 0.4 mm–0.7 mm. This type of diaphragm is very effective for very diluted solutions treatment. Deviation from the geometric correct surface of the diaphragm should be not more than 0.05 mm in any place on its surface. Otherwise, conditions for creating dual electric layer on the surface of diaphragm are altered and influence of dual electric layer on the resistance of the diaphragm is altered also, causing low quality of solutions treatment due to unequal work along the surface.

The diaphragm is fasten by elastic gaskets, which are placed in bushing grooves, making it easy to assemble a cell and provide coaxiality.

It is essential that a restriction for the diameter of the middle section of internal electrode by effected by the correlation:

$$2M<D<4M$$

where: D=diameter of the middle section of internal electrode in mm, and

M=inter-electrode distance in mm.

Inter-electrode distance should be 2.8 mm–3.3 mm. When reducing this distance, the capillary effect reduces the effectiveness of the electrochemical process. When increasing this distance, power consumption is also increased and is impossible to achieve a mass and energy exchanging self-organizing process.

It is also important that the length of the middle section of the internal electrode be either shorter than the lengths of the external electrode on the value of 2M, or longer than the lengths of the external electrode on the value of not less than 2M. The length of the external electrode may vary from 50 mm to 240 mm, thus providing the optimal gas-filling of treated liquid in any working condition of the cell.

Mutual correlation of internal and external electrode dimensions is determined by the polarity of the electrodes. If the external electrode is connected with the negative pole of the power supply, and the internal electrode is connected with the positive pole of the power supply, then the length of the middle section of the internal electrode exceeds the length of the external electrode at the value of not less than 2M. If the external electrode is connected with the positive pole of the power supply and the internal electrode is connected with the negative pole of the power supply, then the internal electrode middle section length is equal or less than the external electrode length at the value of 2M. The internal electrode is installed in the cell symmetrically to the external electrode in any case. Such a design prevents the coating of the electrodes from wearing out in places of high intensity electric field (concentration of the field in places of changing form or on the pin-ends). Precise internal electrode fastening is important for the efficient working of the cell. Fastening of the internal electrode in the heads by elastic gaskets placed in the axial head channels, provides a strict coaxiality with relatively simple assembling. The design of the cell can be different to meet requirements for electrode coaxiality. For instance, when the length of the middle section of the internal electrode exceeds the length of the external electrode, the internal electrode must be made long enough to form slot joints with the axial head channels. Elastic gaskets are placed in the slot joints. The axial channels of the head have a variable section. This provides coaxiality and avoids deformation of the elastic gaskets. Alternatively, the middle section of the internal electrode forms slot joints with the axial channels of the upper and lower heads, then elastic gaskets are placed in grooves on middle section of internal electrode. This design makes assembling easy. If fastening of the internal electrode in the heads is provided by the packing of its pin-ends (when the middle section is smaller than the length of the external electrode, or the middle section is longer, but does not reach the location of the heads), then the diameter of the axial head channel is equal to the diameter of the internal electrode pin-ends, and elastic gaskets are placed in grooves, which are made on the surfaces of the internal electrode pin-ends situated in the axial head channels. Alternatively, the diameter of the axial head channels is equal to the diameter of the pin-ends of the internal electrode and the axial channels are wider at the end of the head to allow for elastic gaskets and additional clamp dielectric bushings.

Water is treated while passing through the cell chambers from the bottom to the top. Treated water and/or solution flow through the electrode chambers of the cell separately.

The invention can be illustrated by the following examples which are not intended to exhaust all of the invention possibilities.

If not mentioned separately, an ultrafiltration ceramic diaphragm (composition: zirconium oxide—60% mass, aluminum oxide—27% mass, yttrium oxide—3% mass) is used in all examples.

Example 1. Cell for water disinfection. The external electrode is connected to the negative pole of the power supply and is made from polished titanium. The internal electrode is made from titanium coated with manganese oxide and connected to the positive pole of the power supply. The length of the external electrode is 80 mm. The distance between electrodes is 2.9 mm. The diameter of the middle section of the internal electrode is 9.0 mm; the length of the middle section is 86 mm. The diaphragm is a cylinder with wall thickness 0.5 mm along its entire length. The mineralization of the treated water was 0.5 g/l. The amount of microorganisms in the treated water was $10^5$ colonies in 1 ml. The mineralization of water remains the same after treatment, but microorganisms are eliminated.

Conclusion: It is reasonable to use a cell with dimensions close to minimum values (as specified in the formula) for water sterilization by portable devices in the field.

Example 2. Cell for production of disinfectant. The external electrode is connected to the negative pole of the power supply and made from glass carbon. The internal electrode is made from titanium, coated with ruthenium oxide and connected to the positive pole of the power supply. The length of the external electrode is 240 mm. The length of the middle section of the internal electrode is 250 mm. The diameter of the middle section is 10 mm. The distance between electrodes is 3 mm. The diaphragm is a cylinder with the wall thickness of 0.6 mm.

The treated solution was sodium chloride with a concentration of 2 g/l. The flow rate of the treated solution was 30 l/hour through the anode chamber and was 5 l/hour through the cathode chamber. As a result, two solutions with the following parameters were obtained:

anode chamber output (anolyte): pH=6.0, ORP=+800 mV cathode chamber output (catholyte): pH=8.6, ORP=+600 mV The power consumption is 0.95 kWt.hour/cub.m.

Example 3. A process for obtaining disinfectants by means of the cell was conducted under the same conditions as in example 2, but the diaphragm was a truncated cone with the conicity value 1:500 and a wall thickness of 0.7 mm, constant along the entire length of the diaphragm. The diaphragm was installed with the big base facing upward. After processing, anolyte was obtained with pH=5.5 and ORP=+900 mV and catholyte was obtained with pH=8.0 and ORP=−550 mV.

When the diaphragm was installed with the big base facing downward, anolyte was obtained with pH=6.3 and ORP=+650 mV and catholyte was obtained with pH=9.1 and ORP=−730 mV.

Example 4. A process for obtaining disinfectants and washing solution by means of the cell was conducted under the same conditions as in example 2, but the external surface of the diaphragm was a cylinder and the internal surface of the diaphragm was a cone with a wall thickness of the upper butt-end 0.5 mm and the lower butt-end 0.8 mn. The width of the cathode chamber was a constant through the cell, but the anode chamber is wider at the top end. The results of treatment are as follows: pH of anolyte was 5.6, ORP of anolyte was +900 mV, pH of catolyte was 8.7 and ORP of catholyte was −780 mV.

Example 5. The cell for obtaining chlorine (a mixture of oxidants which are chlorine and oxygen mainly) by means of the electrolysis of sodium chloride water solution. The external electrode is made from titanium, coated with ruthenium oxide and connected to the positive pole of the power supply. The internal electrode (cathode) is made from titanium and coated with pyrographite. The length of the external electrode is 240 mm. The length of the middle section of the internal electrode is 230 mm. The diameter of the middle section is 11 mm. The distance between electrodes is 3.1 mm. The diaphragm is a cylinder with the wall thickness 0.6 mm. Sodium chloride water solution with a concentration 300 g/l was introduced and treated in the anode chamber of the cell. Tap water with a mineralization 0.5 g/l was introduced and treated in the cathode chamber. Water and solution were treated while flowing through the cell chambers from the bottom to the top. As a result, 10 liters of gas were obtained. The gas contains chlorine 70%, chlorine dioxide 20%, oxygen 7% and the rest (admixtures) 3%. The conversion degree of chloride is about 30% after passing through the cell.

The cathode chamber output is sodium hydroxide with pH=13. This solution can be used in galvanic production or other technologies. This examples proves that the cell can be effectively used for chlorine manufacturing.

The invention simplifies the design of the cell, makes possible the placing together of a required amount of cells in a smaller space, simplifies the fixation system for the elements of the cell, provides high reliability and increases the lifespan of the cell due to elimination of the influence of curved electrical field in the space between electrodes and expands the functional abilities of the cell making it possible to regulate the gas-filling of the electrolyte during the electrochemical process. The cell can be effectively used for water purification and disinfection, for obtaining solutions with predetermined characteristics and for obtaining products by means of the electrolysis of water solutions.

What is claimed is:

1. An electrochemical cell for the treatment of water and/or water solutions comprising:

a) a vertical, cylindrical, variable section internal electrode having a middle section and a pin-end at each end thereof;

b) a vertical, cylindrical external electrode mounted around the internal electrode;

c) a coaxial ceramic diaphragm mounted in an interelectrode space between the internal electrode and the external electrode;

d) the electrodes are made from materials that are non-soluble during electrolysis;

e) the external electrode is mounted in a lower dielectric bushing and an upper dielectric bushing, each having a slot on a butt-end thereof;

f) the internal electrode is connected with a positive pole of a power supply and the external electrode is connected with a negative pole of a power supply;

g) the cell further including an upper dielectric collector head and a lower dielectric collector head which each have an axial channel; each collector head being installed in the bushing slots and adapted for turning therein;

h) the diaphragm being fastened by elastic gaskets mounted in the slots of the bushings;

i) the diameter of the middle section of the internal electrode being defined by the formula:

$$2M < D < 4M$$

where:

D=diameter of the middle section of the internal electrode in mm, and

M=distance between electrodes in mm and j) the lower head and the upper head and the lower bushing and the upper bushing having channels for the treated water and/or treated solution supply to be sent into and discharged from the chambers of the internal external electrodes.

2. The electrochemical cell of claim 1 wherein the length of the middle section of the internal electrode exceeds the length of the external electrode by a value of not less than 2M.

3. An electrochemical cell for the treatment of water and/or water solutions comprising:

a) a vertical, cylindrical, variable section internal electrode having a middle section and a pin-end at each end thereof;

b) a vertical, cylindrical external electrode mounted around the internal electrode;

c) a coaxial ceramic diaphragm mounted in an interelectrode space between the internal electrode and the external electrode;

d) the electrodes are made from materials that are non-soluble during electrolysis;

e) the external electrode is mounted in a lower dielectric bushing and an upper dielectric bushing, each having a slot on a butt-end thereof;

f) the internal electrode is connected with a negative pole of a power supply and the external electrode is connected with a positive pole of a power supply;

g) the cell further including an upper dielectric collector head and a lower dielectric collector head which each have an axial channel; each collector head being installed in the bushing slots and adapted for turning therein;

h) the diaphragm being fastened by elastic gaskets mounted in the slots of the bushings;

i) the diameter of the middle section of the internal electrode being defined by the formula:

$$2M < D < 4M$$

where:

D=diameter of the middle section of the internal electrode in mm, and

M=distance between electrodes in mm and j) the lower head and the upper head and the lower bushing and the upper bushing having channels for the treated water and/or treated solution supply to be sent into and discharged from the chambers of the internal external electrodes.

4. The electrochemical cell of claim 3 wherein the length of the middle section of the internal electrode is equal to or less than the length of the external electrode by a value of 2M.

* * * * *